(12) United States Patent
Rybak et al.

(10) Patent No.: US 7,945,248 B2
(45) Date of Patent: *May 17, 2011

(54) MOBILE COMMUNICATIONS DEVICE EMPLOYING MULTIPLE DATA STORAGE LOCATIONS FOR ELECTRONIC MESSAGES

(75) Inventors: Michal A. Rybak, Kitchener (CA); Arun Munje, Kanata (CA)

(73) Assignee: Research In Motion Limited, Waterloo (CA)

(*) Notice: Subject to any disclaimer, the term of this patent is extended or adjusted under 35 U.S.C. 154(b) by 660 days.

This patent is subject to a terminal disclaimer.

(21) Appl. No.: 11/952,757

(22) Filed: Dec. 7, 2007

(65) Prior Publication Data

US 2008/0076460 A1    Mar. 27, 2008

Related U.S. Application Data

(63) Continuation of application No. 11/061,203, filed on Feb. 18, 2005, now Pat. No. 7,308,252.

(51) Int. Cl.
*H04L 12/58* (2006.01)
*H04M 11/00* (2006.01)

(52) U.S. Cl. .................................. 455/412.1; 379/93.24

(58) Field of Classification Search ............... 455/412.1, 455/419, 426.1, 403, 418, 422.1, 550, 564, 455/575; 379/93.23, 56.1–56.3, 90.1; 705/14
See application file for complete search history.

(56) References Cited

U.S. PATENT DOCUMENTS

| | | | |
|---|---|---|---|
| 5,377,354 A * | 12/1994 | Scannell et al. | |
| 5,705,995 A * | 1/1998 | Laflin et al. | |
| 5,835,861 A * | 11/1998 | Whiteside | 455/466 |
| 5,844,969 A * | 12/1998 | Goldman et al. | 379/93.24 |
| 5,848,397 A * | 12/1998 | Marsh et al. | 705/14.61 |
| 6,351,640 B1 * | 2/2002 | DeMont | 455/426.1 |
| 6,847,989 B1 * | 1/2005 | Chastain et al. | 709/207 |
| 7,308,252 B2 * | 12/2007 | Rybak et al. | 455/412.1 |
| 2002/0087584 A1 * | 7/2002 | Hung | |
| 2003/0145058 A1 * | 7/2003 | Chan et al. | 709/206 |
| 2004/0210640 A1 * | 10/2004 | Chadwick et al. | 709/207 |
| 2009/0125528 A1 * | 5/2009 | Choi | 707/100 |

FOREIGN PATENT DOCUMENTS

DE    103 25 242 A1 * 12/2004
EP    0 982 959 A2 *  3/2000

OTHER PUBLICATIONS

European Search Report Application No. 05250928.8; European Patent Office; Jun. 28, 2005; 7 pages.

* cited by examiner

*Primary Examiner* — Melody Mehrpour
(74) *Attorney, Agent, or Firm* — The Danamraj Law Group, P.C.

(57) ABSTRACT

A computer readable medium encoded with computer executable instructions thereon for execution by a processor of a mobile communication device (116) comprises a code segment (216) for message processing, which may include a code segment for rule comparison, a code segment for message routing and a code segment for default message handling. The message processing code segment (216) processes an incoming message received via a data service network (400). The message processing code segment (216) subsequently compares a portion of each incoming message to at least one criterion contained in at least one message routing rule having a message database object (418, 420) associated with it, stores each incoming message meeting each criterion for a message routing rule in the message database object (418, 420) associated with that message routing rule, and stores all messages not routed to a message database object (418, 420) according to a message routing rule into a default message database object (422).

13 Claims, 5 Drawing Sheets

US 7,945,248 B2

MOBILE COMMUNICATIONS DEVICE EMPLOYING MULTIPLE DATA STORAGE LOCATIONS FOR ELECTRONIC MESSAGES

CROSS-REFERENCE TO RELATED APPLICATIONS

This application is a continuation of U.S. patent application Ser. No. 11/061,203 filed Feb. 18, 2005.

TECHNICAL FIELD OF THE APPLICATION

The present disclosure generally relates to wireless packet data service networks. More particularly, and not by way of any limitation, the present disclosure is directed to a mobile communications device and related data service network employing multiple data storage locations for electronic message information.

BACKGROUND

Mobile communications devices are often designed to receive electronic messages through more than one channel and in more than one format. For example, a mobile communications device may be designed to receive electronic mail (email) messages sent over the internet to one or more email addresses as well as text messages sent to a mobile telephone number assigned to the device. In certain cases, the channel or format through which a message is received may have relevance to the content or the purpose of the message itself.

SUMMARY

The present disclosure relates to a computer readable medium encoded with computer executable instructions thereon for execution by a processor of a mobile communication device. According to a first aspect, the computer readable medium comprises a code segment for processing at least one incoming message received via a data service network; a code segment for comparing the content of each incoming message to at least one criterion contained in at least one message routing rule having a message database object associated therewith; a code segment for storing each incoming message meeting each criterion for a message routing rule in the message database object associated with that message routing rule; and a code segment for storing all messages not routed to a message database object according to a message routing rule into a default message database object.

In certain embodiments, at least one message routing rule routes at least one incoming message based on at least one of message source data, message destination data and message type data. In certain embodiments, at least one incoming message contains at least message source data, message destination data and message type data. In certain embodiments, message type data is selected from electronic mail messages, SMS messages, broadcast messages and PIN2PIN messages. In certain embodiments, message destination data is selected from an electronic mail address, a device identification number and a telephone number. In certain embodiments, message source data is selected from an electronic mail address, a device identification number and a telephone number.

According to a second aspect, the computer readable medium comprises a code segment for configuring a first message database object, disposed within the mobile communications device, containing a first set of message data; a code segment for configuring a second message database object, disposed within the mobile communications device, containing a second set of message data; a code segment for processing new message data received from a source outside of the mobile communications device through a wireless data service network; a code segment for selecting a destination for the new message data from the first data storage space and second data storage space based upon at least one message routing rule; and a code segment for routing any incoming message not meeting a message routing rule to a default message storage object.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

Figure 1:
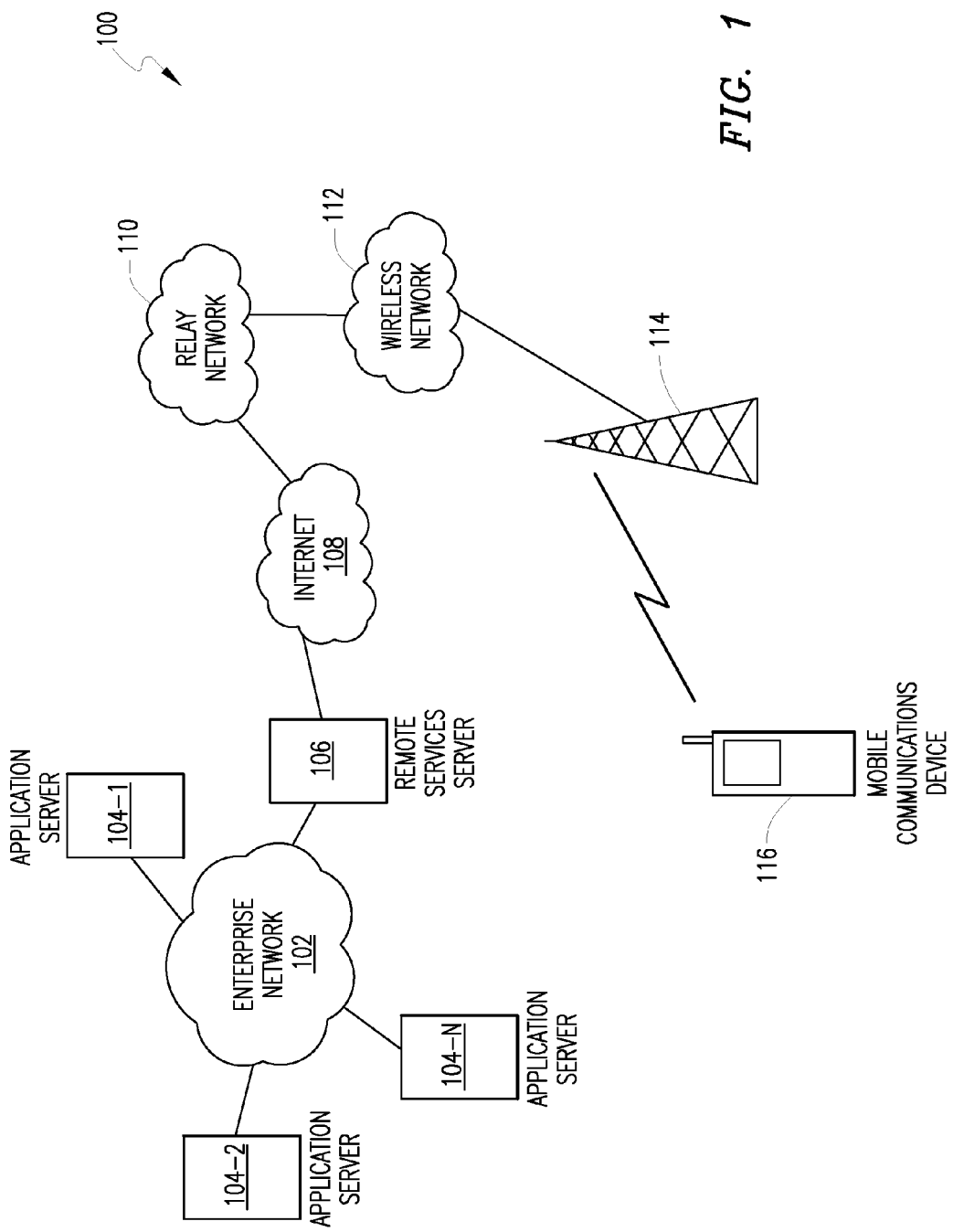
FIG. 1 depicts an exemplary network environment including a wireless packet data service network wherein an embodiment of the present disclosure may be practiced.

The present disclosure will now be described with reference to various examples of how the embodiments can best be made and used. Like reference numerals are used throughout the description and several views of the drawings to indicate like or corresponding parts, wherein the various elements are not necessarily drawn to scale.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, $i$=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device 116. A secure communication link with end-to-end encryption may be established that is mediated through an external IP network, i.e., a public packet-switched network such as the Internet 108, as well as the wireless packet data service network 112 operable with Mobile communications device 116 via suitable wireless network infrastructure that includes a base station (BS) 114

In one embodiment, a trusted relay network 110 may be disposed between the Internet 108 and the infrastructure of wireless packet data service network 112. By way of example, mobile communications device 116 may be a data-enabled handheld device capable of receiving and sending messages, web browsing, interfacing with corporate application servers, et cetera.

For purposes of the present disclosure, the wireless packet data service network 112 may be implemented in any known or heretofore unknown mobile communications technologies and network protocols. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
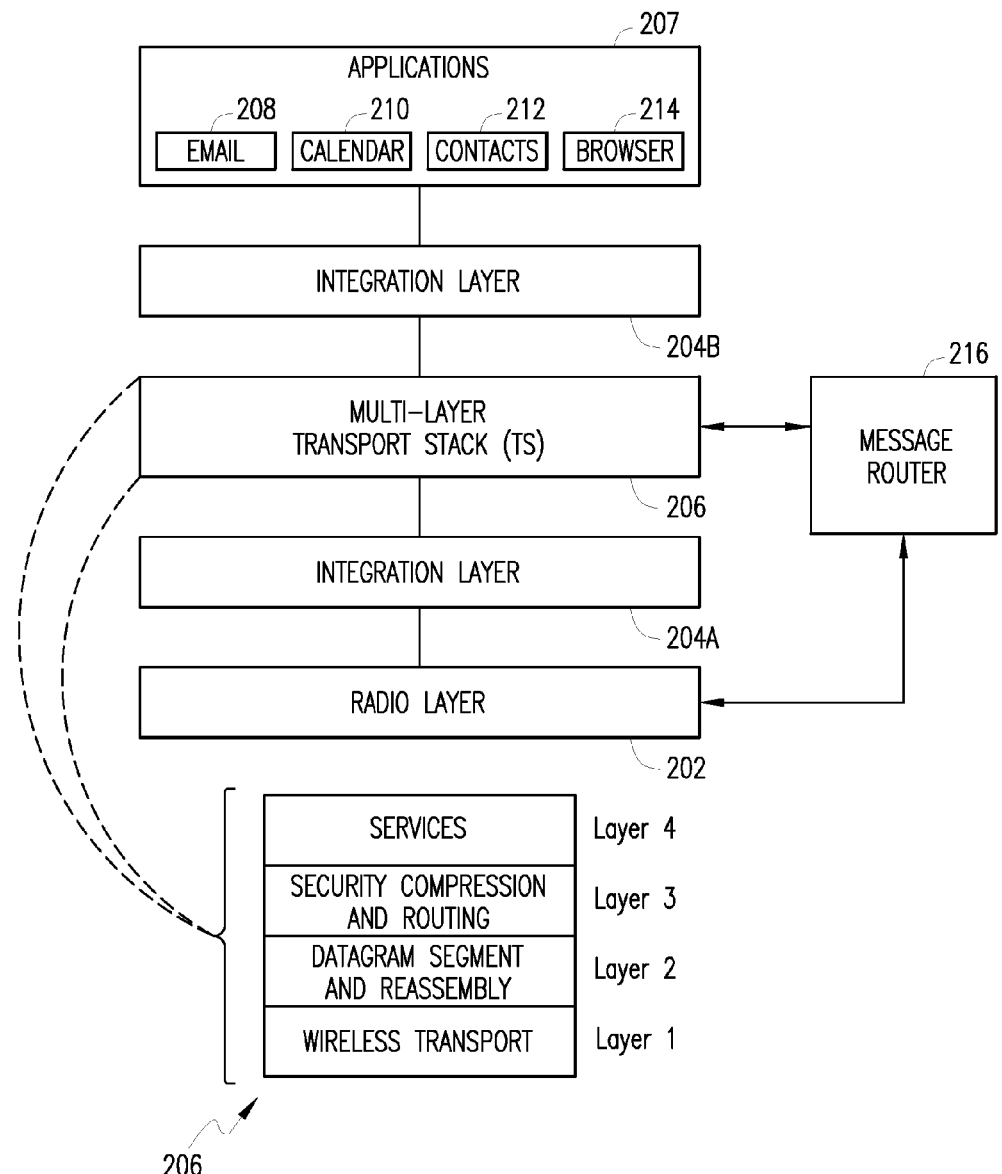
FIG. 2 depicts a software architectural view of a mobile communications device operable to route incoming messages according to one embodiment.

FIG. 2 depicts a software architectural view of a mobile communications device according to one embodiment. A multi-layer transport stack (TS) 206 is operable to provide a generic data transport protocol for any type of corporate data, including email, via a reliable, secure and seamless continuous connection to a wireless packet data service network.

As illustrated in the embodiment of FIG. 2, an integration layer 204A is operable as an interface between the radio layer 202 and the transport stack 206 of mobile communications device 116. Likewise, another integration layer 204B is provided for interfacing between the transport stack 206 and the user applications 207 supported on the mobile communications device 116, e.g., email 208, calendar/scheduler 210, contact management 212 and browser 214. Although not specifically shown, the transport stack 206 may also be interfaced with the operating system of mobile communications device 116. In another implementation, the transport stack 206 may be provided as part of a data communications client module operable as a host-independent virtual machine on a mobile device. As seen in FIG. 2, a message router 216 is disposed between radio layer 202 and transport stack 206.

The bottom layer (Layer 1) of the transport stack 206 is operable as an interface to the wireless network's packet layer. Layer 1 handles basic service coordination within the exemplary network environment 100 shown in FIG. 1. For example, when a mobile communications device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communications device. The remaining two layers of the transport stack 206, Layer 2 and Layer 3, are responsible for datagram segmentation/reassembly and security, compression and routing, respectively.

Figure 3:
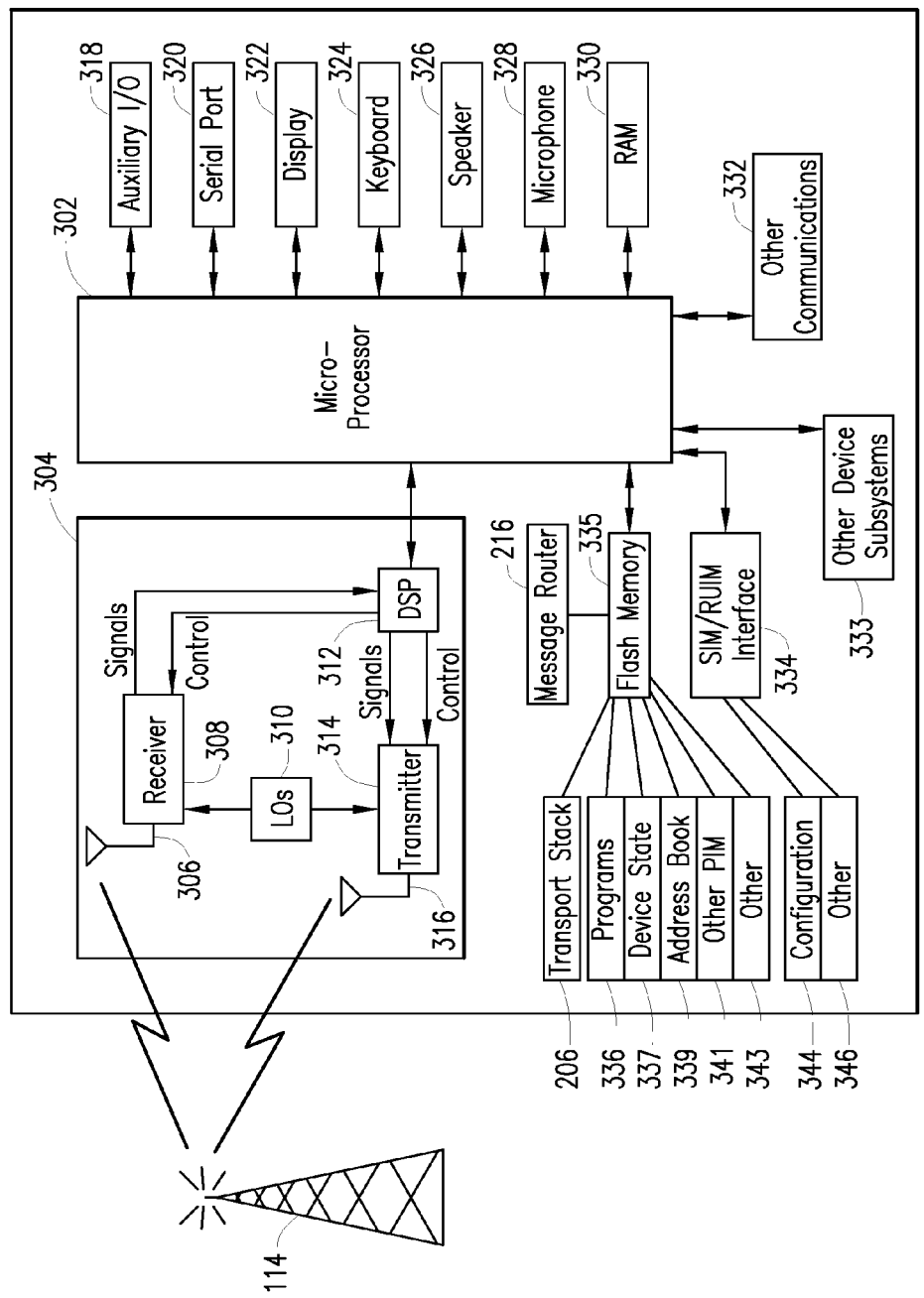
FIG. 3 depicts a block diagram of a mobile communications device operable to route incoming messages according to one embodiment.

FIG. 3 depicts a block diagram of a mobile communications device according to one embodiment. It will be recognized by those skilled in the art upon reference hereto that although an embodiment of mobile communications device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of Mobile communications device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communications device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, Flash memory 335 may be segregated into different areas, e.g., storage area for computer programs 336 as well as data storage regions such as device state 337, address book 339, other personal information manager (PIM) data 341, and other data storage areas generally labeled as reference numeral 343. Message router 216 is operably connected to flash memory 335, including transport stack 206, as shown.

Figure 4:
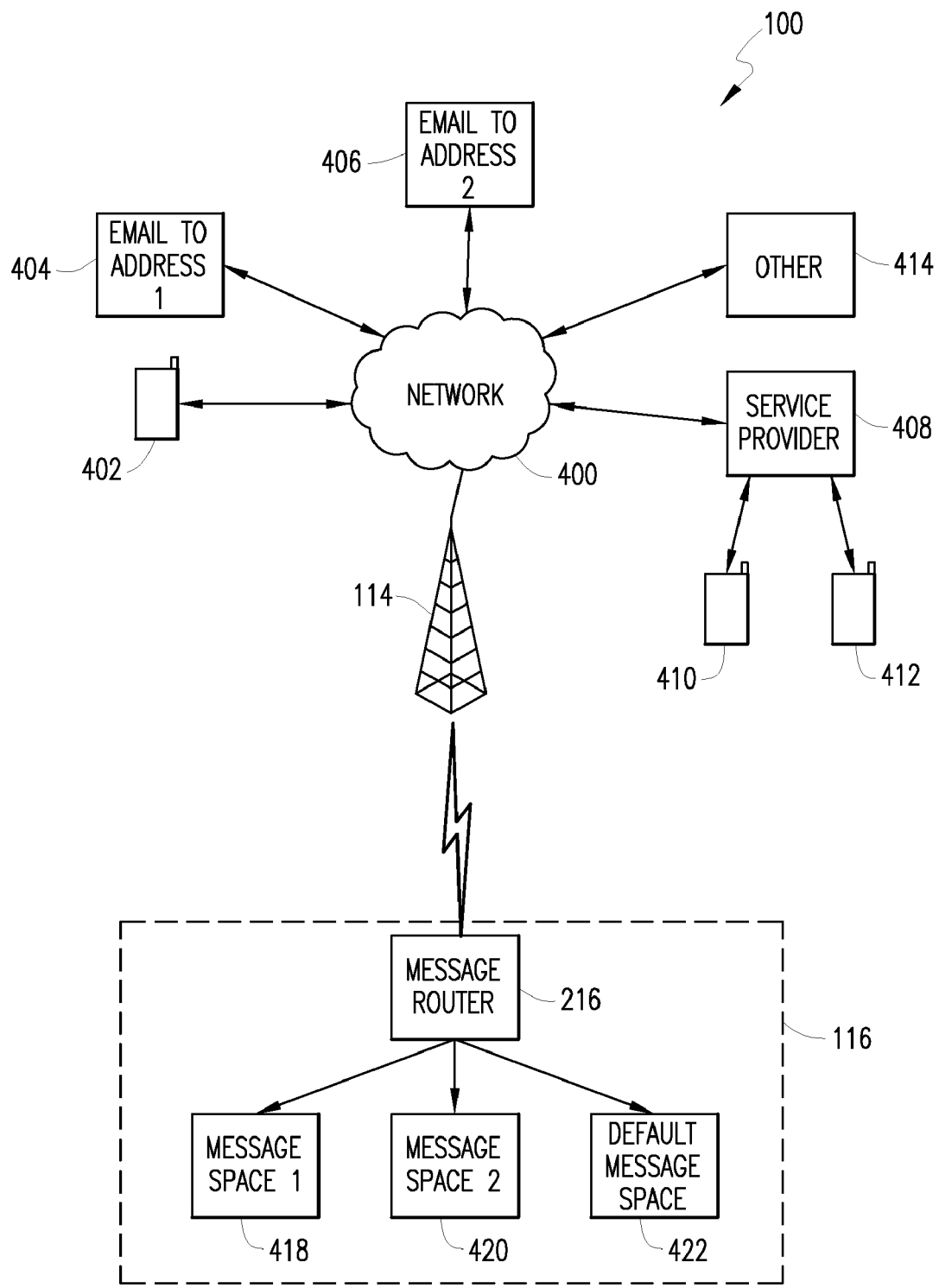
FIG. 4 depicts a block diagram of a mobile communications device operable to route incoming messages received from a communications network according to one embodiment.

FIG. 4 depicts a block diagram of a mobile communications device architecture 400 according to one embodiment. Mobile communications device 116 communicates through base station 114. The network 400 through which mobile communications device 116 communicates may represent a combination of other networks, including, as examples, wireless network 112, relay network 110, internet 108 and enterprise network 102 shown in FIG. 1 and described in connection therewith. Network 400 may, of course, have a different architecture, depending on the particular application.

Network 400 may communicate messages of a variety of message types between a variety of message sources and message recipients. Examples shown in FIG. 4 include mobile communications device 402, electronic mail source 404, electronic mail source 406, service provider 408 and mobile communications device 116. The group of other message sources are represented by message source 414. Any one or more of the above message sources may be included in a particular embodiment. Mobile communications devices 116, 402, 410 and 412 may be similar to one another, or may be completely different from one another, depending on the particular application.

Messages addressed to mobile communications device 116 are communicated to mobile communications device 116 through base station 114. Message router 216 within mobile communications device 116 reviews the characteristics of each incoming message according to a set of rules. Depending on the application, the set of rules within message router 216 may be permanent, may be programmable or may comprise a combination of permanent rules and programmable rules.

Each rule within the message router 216 will route each incoming message to one of a set of message spaces 418-422, which may also be referred to as a message database or message databases, according to one or more particular characteristics of each message. In one embodiment, for example, a rule may route an incoming message to a particular message space, such as message space 418, based upon the identity of the sender, such as a particular electronic mail address, domain name or internet protocol address. In another embodiment, a rule may route an incoming message to a particular message space, such as message space 420, based upon the type of the message. So, for example, a rule may route all incoming text messages to a particular message space, such as message space 418. In other embodiments, two or more criteria may be combined within a single rule to provide additional flexibility.

Any incoming message not routed to a particular one of message spaces 418 or 420 according to any rule in the message router 216 is automatically routed to the default message space 422. In other words, if the message router 216 contains no rules for incoming message routing, all incoming messages of all types will be automatically routed to the default message space 422, as described in more detail below in connection with FIG. 5. Likewise, if no message routing rules within message router 216 apply to a particular message, that message is routed to the default message space 422.

Figure 5:
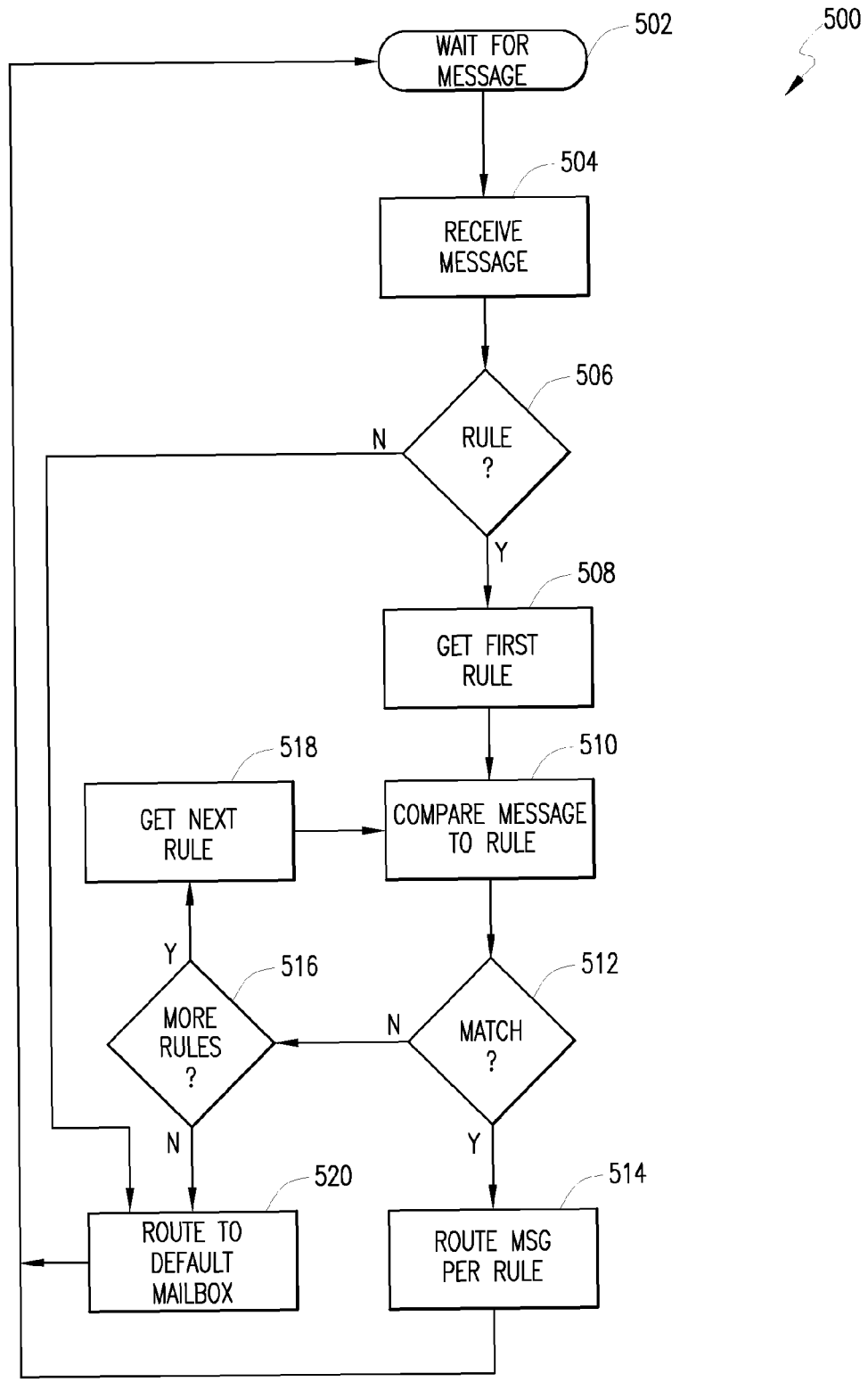
FIG. 5 depicts a flow chart showing the process flow for routing of electronic messages within a mobile communications device.

FIG. 5 depicts a flow chart 500 showing one embodiment of a process flow for routing of incoming electronic messages within mobile communications device 116. Pending the receipt of an incoming message, message router 216 is designed to wait for incoming messages, as indicated by bubble 502. Upon receipt of an indication that an incoming message is available, message router 216 receives the incoming message through the base station 114 and network 400, as indicated in block 504. If there are no rules available to the message router 216 (see diamond 506), then the incoming message is routed to default message space 422, as represented by block 520, and the message router 216 resumes waiting for incoming messages (bubble 502). This would occur, for example, in the situation wherein the mobile communications device 116 is new and has not yet been provisioned with any rules governing message routing. This might also occur in the situation wherein the user of the mobile communications device 116 prefers to have all messages directed to a single unified message space or inbox.

If there is at least one rule available to the message router 216 and an incoming message is received (block 504), the message router 216 retrieves the first rule in the list (see block 508). The characteristics of the incoming message, which may include, for example, the message header data and the content of the body of the message itself, are compared to at least one criterion contained in the rule, as represented in block 510. If the characteristics of the incoming message match the criteria specified in the rule (diamond 512,) the incoming message is routed to the message space (418 or 420) associated with that rule, as shown in block 514, and the message router 216 resumes waiting for incoming messages (bubble 502).

As an example of the sort of criteria which may be employed and implemented in this context, messages originating from a particular source may, by the nature of the message source itself, be designated as high-priority messages, and automatically routed to a particular message space (418 or 420) reserved for high-priority messages. Accordingly, an incoming message will be routed to a particular message space whenever the source data in the message matches the source data criterion contained in the rule. As another example, an incoming message containing a certain keyword in its subject heading, or in the body of the message itself, may be identified as a low-priority (or spam) message, and automatically sent to a message space (418 or 420) reserved for low-priority (or spam) messages.

If there is not a match between the characteristics of the incoming message and the criteria specified in the current rule, the process proceeds to decision diamond 516. If there are more message routing rules to be processed, the next rule is retrieved (block 518), and the process returns to block 510 for comparison of additional incoming message characteristics to the criteria contained in the rule, in the manner described above. If there are no more message routing rules to be processed by the message router 216, the incoming message is routed to the default message space 422 (block 520,) and the message router 216 resumes waiting for incoming messages (bubble 502).

It can be seen from the above that an incoming message will be routed to the default message space 422 in one of at least two situations. As described above, an incoming message will necessarily be routed to the default message space 422 if there are no message routing rules provided to the message router 216. An incoming message will also be routed to the default message space 422 where one or more message routing rules have been specified, but there is no set of specified message routing criteria which properly matches the characteristics of the incoming message. In both of these situations, the message router 216 is left without message routing rules for an incoming message, and the incoming message is routed, by default, to the default message space 422.

As an example of the above, in one embodiment, a mobile communications device 116 may be set up with a set of rules incorporating a first rule for routing incoming electronic mail messages to a first electronic mail address to message space 418 and a second rule for routing incoming electronic mail messages to a second electronic mail address to message space 420. In this embodiment, the message router 216 of the mobile communication device 116 would route an incoming electronic mail message to the first email address to message space 418 according to the provisions of the first rule.

With respect to an incoming electronic mail message to the second email address, which could, for example, originate from electronic mail source 404, the message router 216 in this embodiment would analyze an incoming electronic mail message according to the first rule, and would take no action, as the criterion of the first rule requires that the incoming message destination be the first electronic mail address in order for the first rule to take action with regard to the incoming message.

Having taken no action under the first rule, the message router 216 would then analyze the incoming electronic mail message according to the criterion of the second rule. The criterion of the second rule requires that the message destination be the second electronic mail address. The criterion of the second rule would, therefore, be met by the incoming electronic mail message, and the message router 216 would route the message to message space 420, according to the provisions of the second rule.

With respect to an incoming message which is not sent to either the first electronic mail address or the second electronic mail address, such as a PIN2PIN message, a broadcast message, an SMS message or the like, the message router 216 would take no action. Under these circumstances, the message router 216 in this embodiment would first compare the incoming message to the criterion of the first rule (message destination is the first electronic mail address) and would take no action, as the criterion of the first rule is not met. The message router 216 would then compare the incoming message to the criterion of the second rule (message destination is the first electronic mail address) and would take no action, as the criterion of the second rule is also not met. Finding no specific rule corresponding to the incoming message, the message router 216 would then route the incoming message to the default message space 422.

As another example, in an alternate embodiment, a message router 216 may be set up with a set of rules incorporating a first rule for routing device-specific incoming messages to message space 418 and a second rule for routing all electronic mail messages to message space 420. In this embodiment, the message router 216 of the mobile communication device 116 would route an incoming device-specific message, such as a broadcast message from the user's wireless service provider 408, to message space 418 according to the provisions of the first rule.

With respect to an incoming electronic mail message, which could, for example, originate from electronic mail source 404, the message router 216 in this embodiment would analyze an incoming electronic mail message according to the first rule, and would take no action, as the criterion of the first rule requires that the incoming message type be "device specific" in order for the first rule to take action with regard to the incoming message.

Having taken no action under the first rule, the message router 216 would then analyze the incoming electronic mail message according to the criterion of the second rule. The criterion of the second rule requires that the message be of electronic mail type. The criterion of the second rule would, therefore, be met by the electronic mail message, and the message router 216 would route the message to message space 420, according to the provisions of the second rule.

With respect to an incoming message which is neither a device-specific message nor an electronic mail message, the message router 216 in this embodiment would first compare the incoming message to the criterion of the first rule (message type is device specific) and would take no action, as the criterion of the first rule is not met. The message router 216 would then compare the incoming message to the criterion of the second rule (message type is electronic mail) and would take no action, as the criterion of the second rule is also not met. Finding no specific rule corresponding to the incoming message, the message router 216 would then route the incoming message to the default message space 422.

The above example could apply in a similar manner to a set of messages of a common message type but originating from different sources, such as a set of electronic mail messages originating from separate electronic mail addresses, or a set of text messages originating from different sources, or even a set of messages having certain keywords. Further, there is nothing within the scope of the present disclosure limiting message routing rules to single criteria. Combinations of criteria linked by boolean operators are similarly included within the natural scope of the present disclosure.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A non-transitory computer readable medium encoded with computer executable instructions thereon for execution by a processor of a mobile communication device, the computer readable medium comprising:
   a code segment for processing at least one incoming message received via a data service network;
   a code segment for comparing the content of each incoming message to at least one criterion contained in at least one message routing rule having a message database object associated therewith;
   a code segment for storing each incoming message meeting each criterion for a message routing rule in the message database object associated with that message routing rule; and
   a code segment for storing all messages not routed to a message database object according to a message routing rule into a default message database object.

2. The computer readable medium of claim 1 wherein at least one message routing rule routes at least one incoming message based on at least one of message source data, message destination data and message type data.

3. The computer readable medium of claim 1 wherein at least one incoming message contains at least message source data, message destination data and message type data.

4. The computer readable medium of claim 3 wherein message type data is selected from electronic mail messages, SMS messages, broadcast messages and PIN2PIN messages.

5. The computer readable medium of claim 3 wherein message destination data is selected from an electronic mail address, a device identification number and a telephone number.

6. The computer readable medium of claim 3 wherein message source data is selected from an electronic mail address, a device identification number and a telephone number.

7. A non-transitory computer readable medium encoded with computer executable instructions thereon for execution by a processor of a mobile communication device, the computer readable medium comprising:
   a code segment for configuring a first message database object, disposed within the mobile communications device, containing a first set of message data;
   a code segment for configuring a second message database object, disposed within the mobile communications device, containing a second set of message data;

a code segment for processing new message data received from a source outside of the mobile communications device through a wireless data service network;

a code segment for selecting a destination for the new message data from the first data storage space and second data storage space based upon at least one message routing rule; and a code segment for routing any incoming message not meeting a message routing rule to a default message storage object.

8. The computer readable medium of claim 7 wherein message data contains message source data, message type data and message destination data.

9. The computer readable medium of claim 8 wherein message type data identifies a message type selected from electronic mail messages, SMS messages, broadcast messages and PIN2PIN messages.

10. The computer readable medium of claim 8 wherein message destination data identifies a destination selected from an electronic mail address, a device identification number and a telephone number.

11. The computer readable medium of claim 8 wherein message source data identifies a source selected from an electronic mail address, a device identification number and a telephone number.

12. The computer readable medium of claim 7 wherein at least one message routing rule routes an incoming message according to data contained in a subject field of an incoming message.

13. The computer readable medium of claim 7 wherein at least one message routing rule routes an incoming message according to data contained in the body of an incoming message.

* * * * *